(12) United States Patent
Cook et al.

(10) Patent No.: US 9,434,476 B2
(45) Date of Patent: Sep. 6, 2016

(54) AIRCRAFT INTERIOR LAVATORY

(71) Applicant: B/E Aerospace, Inc., Wellington, FL (US)

(72) Inventors: Donald F. Cook, Arlington, WA (US); Liberty Harrington, Seattle, WA (US); Philipp Steiner, Seattle, WA (US); Robert K. Brauer, Seattle, WA (US); Trevor Skelly, Mercer Island, WA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/709,409

(22) Filed: May 11, 2015

(65) Prior Publication Data
US 2015/0239564 A1     Aug. 27, 2015

Related U.S. Application Data

(63) Continuation of application No. 14/043,500, filed on Oct. 1, 2013, which is a continuation of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
*B64D 11/06*     (2006.01)
*B64D 11/02*     (2006.01)
*B64C 1/10*      (2006.01)

(52) U.S. Cl.
CPC ............... *B64D 11/02* (2013.01); *B64C 1/10* (2013.01); *Y02T 50/46* (2013.01)

(58) Field of Classification Search
CPC .......... B64D 11/00; B64D 2011/0046; B64D 11/0023; B64D 11/06; B64D 2011/0617; B64D 2011/0665; B63B 11/00; B63B 11/02; B63B 29/00; B63B 29/02
USPC ............ 244/1 R, 118.5, 118.6, 129.1, 117 R; 114/116
See application file for complete search history.

(56) References Cited

U.S. PATENT DOCUMENTS 2,650,368 A * 9/1953 Evans ............................... 52/34
2,760,443 A * 8/1956 Gobrecht ....................... 105/315

(Continued)

FOREIGN PATENT DOCUMENTS

DE     694 22 723     6/2000
DE     697 25 542     4/2004

(Continued)

OTHER PUBLICATIONS

Slide Deck, B/E Aerospace, Spacewall Technology, Examiner Interview, Feb. 24, 2016, 53 pages.

(Continued)

*Primary Examiner* — Benjamin P Lee
(74) *Attorney, Agent, or Firm* — Oblon, McClelland, Maier & Neustadt, L.L.P

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

6 Claims, 1 Drawing Sheet

(56) References Cited

U.S. PATENT DOCUMENTS

| | | | | |
|---|---|---|---|---|
| 2,914,001 | A * | 11/1959 | Murphy | 105/315 |
| 3,738,497 | A * | 6/1973 | Betts et al. | 211/1.57 |
| 4,055,317 | A * | 10/1977 | Greiss | 244/118.5 |
| 4,884,767 | A * | 12/1989 | Shibata | 244/118.5 |
| 5,150,863 | A * | 9/1992 | Hozumi | 244/118.5 |
| 5,333,416 | A * | 8/1994 | Harris et al. | 52/27 |
| 5,340,059 | A * | 8/1994 | Kanigowski | 244/121 |
| 5,482,230 | A * | 1/1996 | Bird et al. | 244/121 |
| 5,529,265 | A * | 6/1996 | Sakurai | 244/118.5 |
| 5,577,358 | A * | 11/1996 | Franke | 52/238.1 |
| 5,611,503 | A | 3/1997 | Brauer | |
| 5,716,026 | A * | 2/1998 | Pascasio et al. | 244/118.6 |
| 6,000,659 | A | 12/1999 | Brauer | |
| 6,079,669 | A * | 6/2000 | Hanay et al. | 244/118.5 |
| 6,237,872 | B1 * | 5/2001 | Bar-Levav | 244/118.6 |
| 6,615,421 | B2 * | 9/2003 | Itakura | 4/664 |
| 6,822,812 | B1 | 11/2004 | Brauer | |
| 6,874,731 | B1 | 4/2005 | Brauer et al. | |
| 6,889,936 | B1 * | 5/2005 | Pho et al. | 244/118.5 |
| D508,173 | S | 8/2005 | Guard et al. | |
| D516,496 | S | 3/2006 | Guard et al. | |
| D533,129 | S | 12/2006 | Guard et al. | |
| 7,156,345 | B2 | 1/2007 | Brauer et al. | |
| 7,222,820 | B2 * | 5/2007 | Wentland et al. | 244/118.5 |
| 7,252,267 | B2 | 8/2007 | Young et al. | |
| 7,284,287 | B2 * | 10/2007 | Cooper et al. | 4/664 |
| 7,331,545 | B2 | 2/2008 | Young et al. | |
| 7,448,574 | B2 | 11/2008 | Young et al. | |
| 7,448,575 | B2 * | 11/2008 | Cheung et al. | 244/118.6 |
| 7,469,860 | B2 | 12/2008 | Young et al. | |
| 7,516,919 | B2 | 4/2009 | Young et al. | |
| D606,923 | S | 12/2009 | Young et al. | |
| D617,254 | S | 6/2010 | Guard et al. | |
| 7,871,039 | B2 | 1/2011 | Fullerton et al. | |
| 7,934,679 | B2 * | 5/2011 | Bock et al. | 244/118.6 |
| 8,087,613 | B2 | 1/2012 | Fullerton et al. | |
| 8,096,502 | B2 * | 1/2012 | Bock et al. | 244/118.6 |
| 8,109,469 | B2 * | 2/2012 | Breuer et al. | 244/118.5 |
| 8,162,258 | B2 * | 4/2012 | Joannis et al. | 244/118.6 |
| 8,167,244 | B2 * | 5/2012 | Johnson et al. | 244/118.5 |
| 8,177,163 | B2 * | 5/2012 | Wilcynski et al. | 244/118.5 |
| 8,590,838 | B2 | 11/2013 | Cook et al. | |
| D705,909 | S | 5/2014 | Koyama et al. | |
| 2006/0192050 | A1 * | 8/2006 | Cheung et al. | 244/118.6 |
| 2007/0164157 | A1 * | 7/2007 | Park | 244/118.6 |
| 2007/0170310 | A1 * | 7/2007 | Bock et al. | 244/118.5 |
| 2007/0241232 | A1 * | 10/2007 | Thompson | 244/118.6 |
| 2007/0295863 | A1 * | 12/2007 | Thompson | 244/118.6 |
| 2009/0050738 | A1 * | 2/2009 | Breuer et al. | 244/118.5 |
| 2009/0065642 | A1 * | 3/2009 | Cheung et al. | 244/118.6 |
| 2009/0146004 | A1 | 6/2009 | Plant | |
| 2009/0200422 | A1 * | 8/2009 | Johnson et al. | 244/118.5 |
| 2009/0255437 | A1 * | 10/2009 | Hachet et al. | 105/344 |
| 2010/0059625 | A1 | 3/2010 | Saint-Jalmes et al. | |
| 2010/0181425 | A1 | 7/2010 | Guering et al. | |
| 2011/0121134 | A1 * | 5/2011 | Schotte et al. | 244/118.5 |
| 2011/0139930 | A1 * | 6/2011 | Sutthoff et al. | 244/118.5 |
| 2011/0210205 | A1 * | 9/2011 | Bock et al. | 244/118.6 |
| 2012/0112505 | A1 * | 5/2012 | Breuer et al. | 297/217.1 |
| 2012/0253752 | A1 | 10/2012 | Brauer | |
| 2012/0273614 | A1 * | 11/2012 | Ehlers et al. | 244/118.5 |
| 2012/0325964 | A1 * | 12/2012 | Hawkins et al. | 244/118.6 |
| 2013/0206906 | A1 * | 8/2013 | Burrows et al. | 244/118.5 |
| 2014/0014774 | A1 * | 1/2014 | Pozzi et al. | 244/118.6 |
| 2014/0027572 | A1 * | 1/2014 | Ehlers et al. | 244/118.6 |
| 2014/0027574 | A1 | 1/2014 | Obadia et al. | |
| 2015/0363656 | A1 | 12/2015 | Brauer | |

FOREIGN PATENT DOCUMENTS

| | | |
|---|---|---|
| EP | 0 722 404 | 7/1996 |
| EP | 0 850 834 | 7/1998 |
| EP | 1281614 A1 | 3/2005 |
| EP | 1 685 023 | 8/2006 |
| WO | WO03026495 A2 | 4/2003 |
| WO | 2005014395 A1 | 2/2005 |
| WO | 2005080196 A1 | 9/2005 |
| WO | 2007006938 A1 | 1/2007 |

OTHER PUBLICATIONS

International Search Report, Sep. 15, 2011, 8 pages.
Mcdonnell Douglas, DC-10 Customer Configuration, Oct. 1978, 177 pages.
C&D Zodiac, Inc.'s proposal to Scandinavian Airlines System to manufacture S4 Storage Unit, Aug. 23, 2001, 17 pages.
C&D Zodiac, Inc.'s drawings with a leading page entitled "MD90," 27 pages.
Photographs of C&D Zodiac, Inc.'s S4 storage unit, 5 pages.
C&D Zodiac, Inc.'s Petition for Inter Partes Review of U.S. Pat. No. 8,590,838 (including Exhibits tabs 1-9), May 2, 2014, 856 pages.
Technical Proposal by FSI to Air France regarding a Door 4 overhead crew rest station for the Boeing 747, Aug. 3, 1994, 10 pages.
Rendering and photographs of Boeing 747 overhead crew rest station, 3 pages.
B/E Aerospace, Inc.'s Motion for Preliminary Injunction, May 16, 2014, 25 pages.
Greg Chamitoff Declaration in support of B/E Aerospace, Inc.'s Motion for Preliminary Injunction, May 14, 2014, 39 pages.
International Search Report, Jan. 27, 2015, 5 pages, from PCT/US2013/050342 published as WO 2014/014780 on Jan. 23, 2014.
FSI Crew Rest Rendering.†
Air France Letter.†
2007 Startup Boeing Presentation.†
Final Written Decision IPR 2014-00727, Oct. 26, 2015.†
Final Written Decision; Case IPR2014-00727, Paper No. 65 (PTAB Oct. 26, 2015).†
StartupBoeing, DC-10 presentation, copyright 2007.†
Letter from Flight Structures, Inc. To Air France, Aug. 3, 1994, re "B747-400M Door 4 Crew Rest", and enclosures.†
Flight Structures, Inc., 747 Door 4 Overhead Crew Rest rendering.†

\* cited by examiner
† cited by third party

AIRCRAFT INTERIOR LAVATORY

CROSS-REFERENCES TO RELATED APPLICATIONS

This continuation application is based upon U.S. Ser. No. 14/043,500, filed on Oct. 1, 2013, which is a continuation of U.S. Ser. No. 13/089,063, filed on Apr. 18, 2011, U.S. Pat. No. 8,590,838, issue date Nov. 26, 2013, which claims priority from Provisional Application No. 61/326,198, filed Apr. 20, 2010, and Provisional Application No. 61/346,835, filed May 20, 2010, which are incorporated by reference in their entirety herein.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
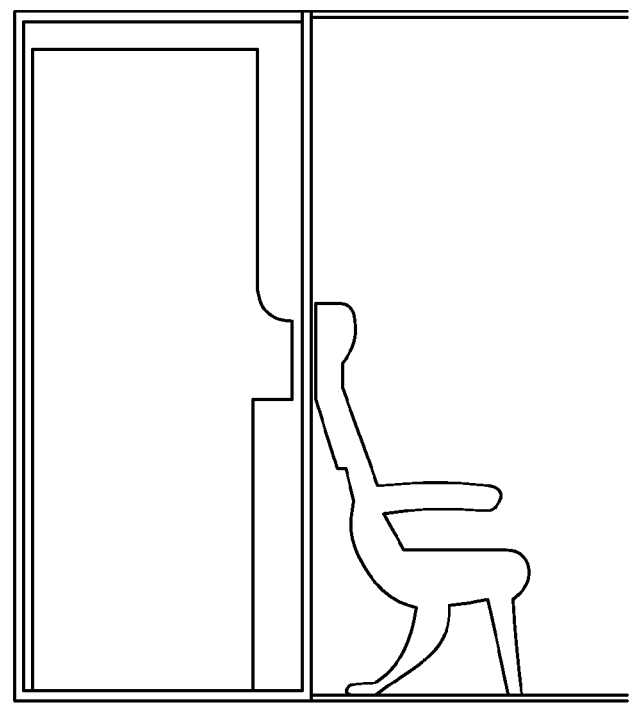
FIG. 1 is a schematic diagram of a prior art installation of a lavatory immediately aft of and adjacent to an aircraft passenger seat.
Figure 2:
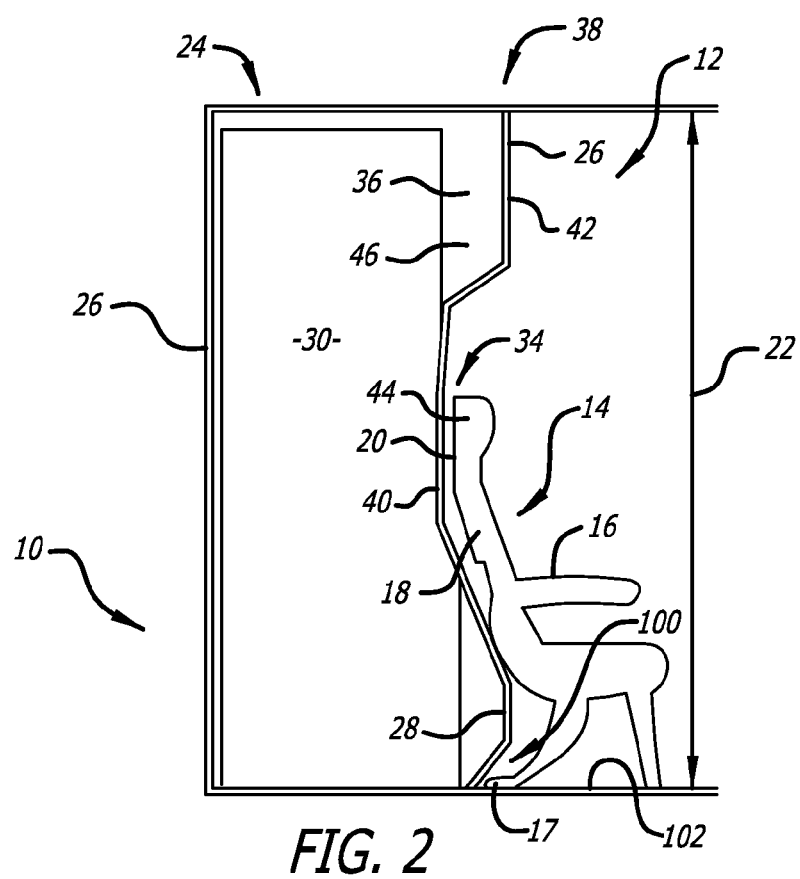
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A method of retrofitting an aircraft to provide additional passenger seating in the cabin of said aircraft, the cabin including a passenger seat having a seat back with an exterior aft surface that is substantially not flat, a seat bottom, and a seat support that interfaces with the floor of the aircraft cabin and holds the seat bottom in an elevated position above the floor of the aircraft cabin, the method comprising the steps of:

installing an aircraft enclosure unit comprising
a forward wall, said forward wall being part of an outer boundary defining a single enclosed space that includes a toilet, said forward wall being substantially not flat and configured to receive a portion of the exterior aft surface of the seat back when the seat back is in an unreclined seat position,
wherein said forward wall is adapted to provide more space forward of the enclosure unit such that the seat support can be positioned further aft in the cabin than if the cabin included another enclosure unit having a substantially flat front wall located in substantially the same position in the cabin as the forward wall, and
wherein said enclosed space is taller than the passenger seat; and
positioning said seat support further aft in said aircraft cabin than said seat support could have been positioned prior to retrofitting said aircraft, whereby a portion of the exterior aft surface of said passenger seat back in the unreclined seat position is received by said forward wall.

2. A method of providing an aircraft with more passenger seats in the aircraft's cabin, the method comprising the steps of:

installing a combination of an enclosure unit and a passenger seat in the aircraft, said passenger seat having a seat back, a seat bottom, and a seat support that interfaces with the floor of the aircraft cabin and holds the seat bottom in an elevated position above the floor of the aircraft cabin, the combination comprising
the passenger seat being configured to be located forward of and proximate to the enclosure unit,
the enclosure unit being located aft of the passenger seat, the enclosure unit having
a forward wall, said forward wall being part of an outer boundary defining a single enclosed space that includes a toilet, said forward wall being substantially not flat and configured to receive a portion of the exterior aft surface of the passenger seat back in an unreclined seat position,
wherein said forward wall is adapted to provide more space forward of the enclosure unit such that the seat support can be positioned further aft in the cabin than if the cabin included another enclosure unit having a front wall that is substantially flat and is located in substantially the same position in the cabin as the forward wall,
wherein said enclosed space is taller than the passenger seat,
whereby said seat support is installed further aft in said cabin than would be possible if the substantially flat front wall of the other enclosure unit was located in substantially the same position in the aircraft cabin as the forward wall, and
whereby a portion of the exterior aft surface of said passenger seat back in the unreclined seat position is received by said forward wall.

3. The method of claim 1, wherein said exterior aft surface of the passenger seat back has a contoured shape, and wherein said forward wall is shaped to substantially conform to the contoured shape of the exterior aft surface of the passenger seat back when the exterior aft surface of said passenger seat back in the unreclined position is received by said forward wall.

4. The method of claim 2, wherein said exterior aft surface of the passenger seat back has a contoured shape, and wherein said forward wall is shaped to substantially conform to the contoured shape of the exterior aft surface of the passenger seat back when the exterior aft surface of said passenger seat back in the unreclined position is received by said forward wall.

5. The method of claim 3, wherein said contoured shape includes a first section extending along a first axis and a second section extending along a second axis, said first section adapted to support a passenger's head and a second adapted to support a passenger's back, wherein said first axis is not parallel with said second axis.

6. The method of claim 4, wherein said contoured shape includes a first section extending along a first axis and a second section extending along a second axis, said first section adapted to support a passenger's head and a second adapted to support a passenger's back, wherein said first axis is not parallel with said second axis.

* * * * *

(12) EX PARTE REEXAMINATION CERTIFICATE (12595th)
United States Patent
Cook et al.

(10) Number: US 9,434,476 C1
(45) Certificate Issued: May 1, 2024

(54) AIRCRAFT INTERIOR LAVATORY

(71) Applicant: B/E Aerospace, Inc., Wellington, FL (US)

(72) Inventors: Donald F. Cook, Arlington, WA (US);
Liberty Harrington, Seattle, WA (US);
Philipp Steiner, Seattle, WA (US);
Robert K. Brauer, Seattle, WA (US);
Trevor Skelly, Mercer Island, WA (US)

Reexamination Request:
No. 90/014,982, Mar. 15, 2022

Reexamination Certificate for:
Patent No.: 9,434,476
Issued: Sep. 6, 2016
Appl. No.: 14/709,409
Filed: May 11, 2015

Related U.S. Application Data

(63) Continuation of application No. 14/043,500, filed on Oct. 1, 2013, now Pat. No. 9,073,641, which is a continuation of application No. 13/089,063, filed on Apr. 18, 2011, now Pat. No. 8,590,838.

(60) Provisional application No. 61/346,835, filed on May 20, 2010, provisional application No. 61/326,198, filed on Apr. 20, 2010.

(51) Int. Cl.
| | | |
|---|---|---|
| *B64D 11/06* | (2006.01) | |
| *B64C 1/10* | (2006.01) | |
| *B64D 1/10* | (2006.01) | |
| *B64D 11/02* | (2006.01) | |
| *B64F 5/00* | (2017.01) | |

(52) U.S. Cl.
CPC ........... *B64D 11/02* (2013.01); *B64C 1/10* (2013.01); *B64D 11/06* (2013.01); *B64D 11/064* (2014.12); *B64F 5/00* (2013.01); *Y02T 50/40* (2013.01)

(58) Field of Classification Search
None
See application file for complete search history.

(56) References Cited

To view the complete listing of prior art documents cited during the proceeding for Reexamination Control Number 90/014,982, please refer to the USPTO's Patent Electronic System.

*Primary Examiner* — Catherine S Williams

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

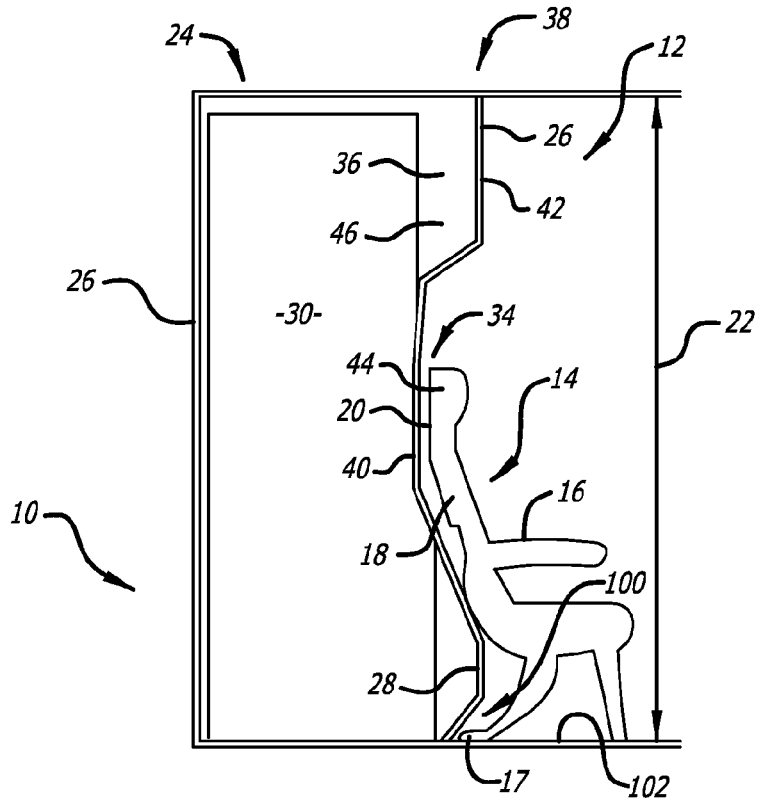

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *